March 19, 1968     A. B. NEWTON     3,373,799
AIR CONDITIONING AND HEATING CONTROL WITH AUTOMATIC CHANGE-OVER
Filed Nov. 14, 1966
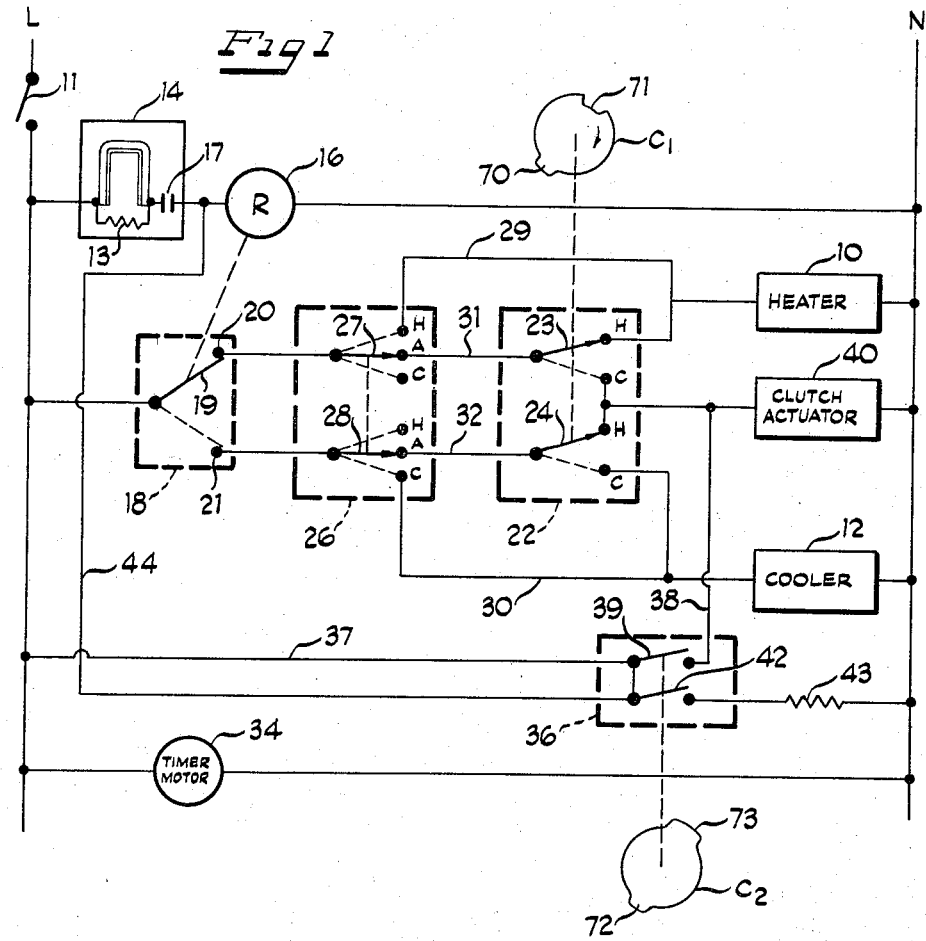
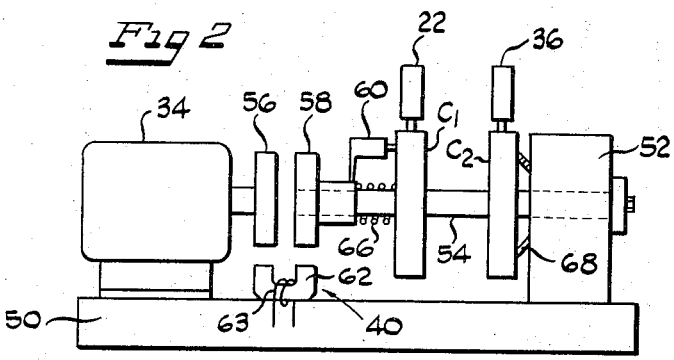
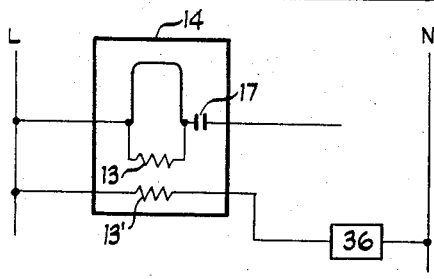
INVENTOR
ALWIN B. NEWTON
BY *Thomas B. Hunter*
ATTORNEY

United States Patent Office 3,373,799
Patented Mar. 19, 1968

---

3,373,799
AIR CONDITIONING AND HEATING CONTROL WITH AUTOMATIC CHANGE-OVER
Alwin B. Newton, Spring Garden Township, York County, Pa., assignor to Borg-Warner Corporation, Chicago, Ill., a corporation of Illinois
Filed Nov. 14, 1966, Ser. No. 593,928
10 Claims. (Cl. 165—12)

This invention relates to controls for heating and cooling systems and more particularly to improvements in controls for all-year air conditioning systems which include means for automatically changing over from heating to cooling and vice versa.

It should be emphasized at the very outset that while the term *air conditioning* often carries a connotation of being limited to cooling (with or without humidity control), the term will be used in this specification to include both heating and cooling. It also may include reference to humidification and dehumidification when used in conjunction with heating and cooling units.

As described in U.S. Patent 3,212,562 (issued to A. B. Newton on Oct. 19, 1965) it is desirable to provide an air conditioning control system which will prevent unnecessary switching back and forth between heating and cooling functions when short-term or transient conditions would seem to indicate a demand for such a change-over. For example, during certain times of the year when cooling is normally required, a brief thundershower may cause a transient drop in outside temperature to the point where the indoor thermostat is calling for heating. Because of the brief duration of such conditions, it is normally unnecessary to change-over from cooling to heating.

In the above-identified Newton patent, a timer is provided to interrupt the change-over mechanism to insure that the indicated changed demands are in effect for some predetermined duration of time. While this control system is satisfactory for many applications, it is unnecessarily complicated and expensive for mass market production.

The present invention relates to a substantially 100 percent mechanical control system which is simple and inexpensive to manufacture and service. The operation of the system to be described below is based on a simple timer mechanism which includes a continuously driven electric motor operating appropriate switch mechanism through a clutch to insure that some predetermined time elapses before the control system makes the transition between heating and cooling or vice versa. The invention also includes novel means for compensating for heating over-runs when a change is made from cooling to heating. Since the change-over occurs at relatively low loads, there is a tendency for the heater to drive the temperature in the controlled space up to an uncomfortable level. This compensating means provides for additional heat to be supplied to the thermostat for at least the first few (2–3) cycles of heating after the change-over has been made.

Accordingly, it is a principal object of the invention to provide an improved all-year air conditioning system which differentiates between transient and long-term conditioning requirements.

Another object of the invention is to provide a simple and economically designed control mechanism which is substantially mechanical in operation and requires little or no maintenance after installation.

Still another object of the invention is to provide an improved air-conditioning control system using a single thermostat for both heating and cooling functions while maintaining the controlled, inside air temperature within close limits.

Additional objects and advantages will be apparent from the reading of the following detailed description taken in accordance with the drawings wherein, FIGURE 1 is a schematic diagram of a control system constructed in accordance with the principles of the present invention;

FIGURE 2 is an illustration, partially schematic, of the timing mechanism which may be used in conjunction with the control circuit of FIGURE 1; and FIGURE 3 is a modification of the circuit shown in FIGURE 1.

Referring now to the drawings, particularly to FIGURE 1, both a heater 10 and a cooler 12 are placed under the operation and control of a single thermostat 14 located within a particular zone receiving the conditioned air. The thermostat 14 is placed in series with a relay 16 across two electrical power supply lines L and N such that the thermostat energizes and de-energizes relay 16 by closing and opening contacts 17. Relay 16 controls a single-pole, double-throw switch 18 such that when the thermostat closes contacts 17 to energize relay 16, switch arm 19 of switch 18 is in solid-line position closing contacts 20; and when the thermostat opens contacts 17 to de-energize relay 16, switch arm 19 is in the dotted-line position closing contacts 21.

A function switch 22, actuated by a cam $C_1$, comprises a double-pole, double-throw switch having switch arms 23, 24 movable between the solid-line positions closing contacts H, H and dotted-line positions closing contacts C, C. The operation of the cam operated switch 22 will be discussed in more detail below.

A manually operated selector switch 26 is interposed between the thermostatic switch 18 and cam operated function switch 22 to permit a choice between heating, cooling and automatic operation. Selector switch 26 comprises a double-pole, three-position switch having switch arms 27 and 28, both of which are movable concurrently between an H position, an A position and a C position. When heating only is required, switch arms 27, 28 are placed in the H position which closes a circuit through line 29 to the heater and bypasses the cam actuated switch 22. Line 30 to the cooler is an open circuit. In the A position the two conductors 31, 32 from the A contacts are connected in parallel to the common side of switch arms 23 and 24 in switch 22. In the C position, switch arms of the manual selector switch bypass cam actuated switch 22 and complete a circuit through line 30 to the cooler. At this time the circuit through line 29 to the heater is open.

A timer motor 34 is connected across L and N and runs continuously, so long as the main power switch 11 is closed, to drive a driving member of a clutch which in turn operates the cam $C_1$, already referred to, and a second cam $C_2$. A double-pole, single-throw switch 36 is actuated by said second cam $C_2$ and is adapted to connect line L through a circiut including lines 37, 38 and switch arm 39 to a clutch actuating mechanism 40 which automatically clutches the driving member of the timer motor with a driven member adapted to engage and drive the two cams.

Switch 36 also completes a circuit through switch arm 42 to supply additional power to a small anticipation heater 13, associated with thermostat 14, said heater being normally energized to add heat at a lower output when thermostat contacts 17 are closed. When additional heater output is required, this is accomplished by closing switch arm 42 of switch 36 to close a circuit through resistance 43 to the other contact terminal of thermostat 14 via line 44. The purpose of heater 13 is to anticipate a rise in temperature during heating to prevent over-runs and also to anticipate a need for cooling during the "off" cycle when in the cooling mode.

Having thus far described the circuit for the operation of the automatic change-over mechanism, attention is now directed to FIGURE 2 which shows the timer mechanism for driving the two cams $C_1$, $C_2$ operating switches 22 and 36 respectively. The timer mechanism comprises a base member 50 supporting the electric timer motor 34 at one end thereof and a shaft journal 52 for supporting, in cantilever fashion, the shaft 54 carrying cams $C_1$, $C_2$ on a common axis. It was earlier pointed out that as long as the main power switch is closed, the timer motor will be continuously driven through a suitable speed reduction gearing (not shown) at a relatively slow r.p.m. The driving disc 56, secured to the motor shaft, forms a part of a clutch mechanism for driving a driven member 58 having a driving pawl 60 attached thereto. While various forms of clutch actuating mechanisms are known, one practical arrangement, shown at 40, may include an electro-magnetic core 62 surrounded by coil 63. When energized, a magnetic field is set up to cause the driving and driven members to move together into frictional engagement such that driven member 58 will begin to rotate to move drive pawl 60 toward engagement with one of the two pins 64, 65 projecting from cam $C_1$. The driven member and drive pawl are supported for independent relative rotation on one end of shaft 54 and are biased by a spring 66 to return to a central or home position whenever the clutch is disengaged by de-energization of coil 63. A suitable stop member (not shown) prevents the drive pawl from rotating past its home position. Cams $C_1$ and $C_2$, on the other hand, will always remain in the position to which the drive pawl has advanced them at the time the clutch is disengaged. This is assured by the frictional engagement at 68 between the base 50 and cam $C_2$. Such friction engagement may be effected, for example, by a Belleville spring interposed between the shaft journal and the back face of the cam.

Referring back to FIGURE 1, cam $C_1$ which actuates the function switch has a projection 70 along one section of the cam surface and a detent 71 spaced about 180° from the projection. The projection 70 is adapted, through a cam follower (not shown), to effect a positioning of the function switch 22 to the "heat" position (solid line) while the detent 71 moves the switch to the "cool" (dotted-line) position. The remaining surface of cam $C_1$ is cut with a constant radius which differs from 70 and 71 by about one half the distance required to move the switch arms 23, 24 from one position to the other. Cam $C_2$ (FIGURE 1) has a first projection 72 on one part thereof and a somewhat larger (in arcuate extent) projection 73 diametrically opposite 72. This cam is adapted to open and close switch 36 in a predetermined manner which will become clear from the description of the operation which follows.

OPERATION

Heating only

For heating only, the manual selector switch 26 is placed with the switch arms in the H position to bypass cam actuated function switch 22 so that a circuit is completed from L to N through the heater and conductor 29 to the thermostatic switch 18 operated by relay 16. Upon a drop in temperature, the thermostat closes to energize the relay and move the thermostatic switch to the solid-line position. This will energize the heater controls; and upon a rise in temperature, the thermostat will open and cause the thermostatic switch to drop to its dotted-line position, closing contacts 21 and opening contacts 20 to cut off the heater. There is no way that the cooler can be energized during this phase of operation.

Cooling only

For cooling, the manual selector switch 26 is placed such that the switch arms are in the C position, thereby placing the cooler under the exclusive control of the thermostatic switch 18 and bypassing the cam actuated switch 22. Upon a rise in temperature, the switch moves to its dotted-line position completing the circuit from L to N through contacts 21, contacts C and the cooler 12. Upon a drop in temperature, the thermostat will close contacts 17 to move the relay operated thermostatic switch arm to its solid-line position and de-energize the cooler.

Automatic operation

For automatic operation the manual selector switch is placed in the A position which completes a circuit from the two A contacts of the selector switch to the common terminals of switch arms 23, 24 in the cam actuated switch 22. Assuming that both cams $C_1$ and $C_2$ are in the position shown in FIGURE 1, the function switch 22 will be in the solid-line position due to the projection of cam $C_1$ having moved the switch arms to the "heat" position. With respect to switch 36, cam $C_2$ will keep this switch in its open (solid-line) position until engaged by one of the two projections 72 or 73. Assuming also that the thermostat is calling for heating, the thermostat will be closed to energize the relay and cause the thermostatic switch to be in its solid-line position completing contacts 20. This closes a circuit through line 31 and switch arm 23 to energize said heater. Upon an increase in temperature, thermostatic switch will open to de-energize the relay and thereby move switch 18 to its dotted-line position. This will open the heater circuit and at the same time close a circuit through line 32 and switch arm 24 to the electromagnetic clutch actuating mechanism 40. The timer motor will then begin to drive both cams and will continue to do so until heating is again called for by the thermostat. When the relay is energized, this will open the circuit to the clutch actuator and begin operation of the heater. While the drive pawl will return to its home position, the two cams will maintain the same position that they were in when the thermostat closed.

Assume now that after discontinuing one of the heating cycles, the thermostat does not demand heating for a considerable period of time. This time period would normally be from 90 minutes to two hours; but in certain applications it may be as high as four hours, depending upon the particular requirements. The clutch has been engaged all this time and will have rotated the cams about 180° to bring the projection 72 on cam $C_2$ into engagement with the follower actuating switch 36. This will close a circuit through lines 37, arm 39 and line 38 to keep the clutch engaged regardless of the position of switch 22. Cam $C_1$ then effects movement of switch 22 to the "cool" (dotted-line) position breaking the circuit through arm 24. The clutch is still engaged through switch 36 however.

At the same time additional heat is being put into thermostat 14 by heater 13 due to increased current flow through resistance 43 and line 44. This will cause the thermostat to open and operate the cooler for a short de-humidification cycle whether the thermostat calls for cooling or not. The angular extent of projections 42 and 43 are sufficient to move cams $C_1$ and $C_2$ past their "actuating" positions without regard to switches 18 and 22. The system will then continue on cooling, with switch 22 in the dotted-line position and switch 36 open, until cooling is not called for a time sufficient to allow the pawl to drive the cams another 180°.

It will be noted that lobe 73 on cam $C_2$ is somewhat larger than cam 72. When a change-over is made from cooling to heating, this will maintain additional heat input into the thermostat by way of switch 36 and switch arm 42 for the first two or three cycles. As previously mentioned, this will prevent large over-runs by increasing the anticipation heat in the thermostat.

A modification of this auxiliary heat input system is illustrated in FIGURE 3. Instead of providing an additional circuit to the input side of thermostat 14, a separate heater may be energized through switch arm 42. This heater, 13', is connected between lines L and N through lines 44, 45, switch arm 42 and line 46.

While this invention has been described in connection with a certain specific embodiment thereof, it is to be understood that this is by way of illustration and not by way of limitation; and the scope of the appended claims should be construed as broadly as the prior art will permit.

What is claimed is:

1. A control system for an air conditioning unit of the type including a heater and a cooler for supplying conditioned air to a controlled space, said system comprising a thermostat sensing temperature of air in said controlled space; a first switch actuated by said thermostat; a second switch selectively placing said first switch over the exclusive control of said heater and said cooler; a timer including switch actuating means for said second switch, a continuously driven motor and a clutch interposed between said motor and said switch actuating means, said switch actuating means being adapted to shift said second switch from a first position whereby the heater is under exclusive control of said first switch and a second position wherein said cooler is under the exclusive control of said first switch; and clutch actuating means operated by said second switch for engaging said clutch to effect a driving connection between said motor and said switch actuating means during periods when neither said heater nor said cooler is energized.

2. A control system as defined in claim 1 including means for bypassing said second switch to selectively place said heater and said cooler under exclusive control of said first switch, said control being independent of the position of said second switch.

3. A system as defined in claim 1 including means for supplying heat energy to said thermostat during periods when said heater is energized and said cooler is de-energized and means for increasing the supply of heat energy for predetermined intervals when any change-over is effected between heating and cooling operations.

4. A system as defined in claim 3 wherein a single heating element is employed to supply said heat energy and said means for increasing the supply of heat energy includes a parallel circuit for supplying additional electrical energy to said heating element.

5. A system as defined in claim 3 including a primary heating element and an auxiliary heating element, said auxiliary heating element being energized to increase the supply of heat energy to said thermostat.

6. A system as defined in claim 1 including a holding circuit including a switch and a bypass circuit around said second switch to maintain said clutch engaged whenever said second switch is moved between said first and said second positions.

7. A system as defined in claim 6 wherein said switch actuating means includes a first cam adapted to actuate said second switch and a second cam adapted to actuate said holding circuit switch.

8. Apparatus as defined in claim 1 wherein said clutch actuating means comprises electro-magnetic means adapted to lock the output from said motor to the input of said switch actuating means.

9. A system as described in claim 7 including cam driving means comprising a drive pawl engaging and driving said cams, said drive pawl being rotatably journalled for independent rotation with respect to said cams and biased to a home position, whereby, upon release of said clutch, the drive pawl returns to said home position.

10. A system as defined in claim 9 wherein said cams are held by friction, upon return of said drive pawl, in the same position that they were in when the drive pawl is released.

References Cited

UNITED STATES PATENTS

| | | | |
|---|---|---|---|
| 2,495,861 | 1/1950 | Newton | 165—12 |
| 2,558,610 | 6/1951 | Diekhoff | 165—12 |
| 2,730,336 | 1/1956 | Shiers | 165—12 |
| 2,865,610 | 12/1958 | Sparrow | 165—12 |
| 2,970,769 | 2/1961 | Penn et al. | 165—26 XR |
| 3,212,562 | 10/1965 | Newton | 165—12 |
| 3,306,348 | 2/1967 | Tucker | 165—26 XR |

ROBERT A. O'LEARY, *Primary Examiner.*

M. A. ANTONAKAS, *Assistant Examiner.*